United States Patent
Saito

Patent Number: 6,151,411
Date of Patent: Nov. 21, 2000

[54] POINT SYMMETRY SHAPING METHOD USED FOR CURVED FIGURE AND POINT SYMMETRY SHAPING APPARATUS THEREOF

[75] Inventor: Shigeru Saito, Tokyo, Japan

[73] Assignee: NEC Corporation, Tokyo, Japan

[21] Appl. No.: 09/219,365

[22] Filed: Dec. 23, 1998

[30] Foreign Application Priority Data

Dec. 26, 1997 [JP] Japan .................................. 9-359468

[51] Int. Cl.[7] .............................. G06K 9/00; G06K 9/46; G06T 11/20; G06T 3/20; H04N 9/74

[52] U.S. Cl. ...................... 382/203; 382/181; 382/201; 382/295; 345/418; 345/438; 345/441; 345/442; 348/580

[58] Field of Search ..................................... 382/181, 195, 382/201, 203, 204, 205, 295; 345/418, 433, 438, 441, 442; 348/580

[56] References Cited

U.S. PATENT DOCUMENTS

| | | | |
|---|---|---|---|
| 4,797,842 | 1/1989 | Nackman et al. | 716/20 |
| 4,933,865 | 6/1990 | Yamamoto et al. | 382/203 |
| 5,426,729 | 6/1995 | Parker | 345/441 |

FOREIGN PATENT DOCUMENTS 62-111369  5/1987  Japan .

*Primary Examiner*—Phuoc Tran
*Assistant Examiner*—Daniel G. Mariam
*Attorney, Agent, or Firm*—Foley & Lardner

[57] ABSTRACT

In a point symmetry shaping apparatus used for a curved figure, any unrecorded symmetry figures are automatically shaped in a point symmetry manner within a short processing time. In the point symmetry shaping apparatus, a coordinate point which constitutes a symmetry center candidate point is calculated from all of center points of symmetry-judging-line-segments. A first point symmetry center candidate point/center point distance calculating unit calculates a distance between the symmetry center candidate point and the center point of the symmetry-judging-line-segment. A point symmetry judging unit judges a point symmetry of the input curved figure in such a manner that a calculation is made of a fluctuation value contained in the distances between the symmetry center candidate point and the center points of the symmetry-judging-line-segments, and the calculated fluctuation value is compared with a threshold value. A point symmetrizing processing unit corrects the coordinate values of the set of the intersection points between the curved line of the input curved figure and the grid, and also the coordinate values of the feature points in order to shape such an input curved figure having a point symmetry judged by the point symmetry judging unit in such a manner that the input curved figure having the point symmetry is positioned in a point symmetry manner with respect to the point symmetry center candidate point.

36 Claims, 14 Drawing Sheets

× : *maximal point, minimal point*
+ : *vertex* symmetry-judging-line-segment

Pn : center point of
symmetry-judging-line-segment
center candidate point center candidate point

POINT SYMMETRY SHAPING METHOD USED FOR CURVED FIGURE AND POINT SYMMETRY SHAPING APPARATUS THEREOF

BACKGROUND OF THE INVENTION

1. Field of the Invention

The present invention is generally related to a point symmetry shaping method used for a curved figure, and also a point symmetry shaping apparatus used for the curved figure. More specifically, the present invention is directed to such point symmetry shaping method/apparatus used for a curved figure, capable of extracting a symmetry center point used to point-symmetry shape an input curved figure, and also capable of shaping this input curved figure in a point symmetry manner with respect to this extracted symmetry center point.

2. Description of the Related Art

Point-symmetry-figure shaping apparatuses for shaping input curved figures in a point symmetry manner are known in this field, for example, as described in Japanese Patent Laid-open Application No. Sho62-111369 published in 1987. These conventional point-symmetry-figure shaping apparatuses are normally employed so as to automatically design drawings and the like and to recognize figure symbols illustrated in these read design drawings.

FIG. 15 is a schematic block diagram for indicating one example of this sort of conventional point symmetry shaping apparatus used for a curved figure. As indicated in this drawing, this conventional point symmetry figure shaping apparatus is arranged by a symmetry shape recognition processing unit 101, a symbol table 102, and a symmetry converting unit 103. The symmetry shape recognition processing unit 101 is constituted by a symmetry shape judging unit 111 and a comparing unit 112.

Referring to the above-explained block diagram of FIG. 15 and a flow chart of FIG. 16, operations of this conventional point symmetry shaping apparatus will be described as follows. In this conventional point symmetry shaping apparatus, an image which is entered to be recognized is read as binary image data. After a symbol element is extracted from this read binary image data, the resultant image data is entered into the recognition processing unit 101. The recognition processing unit 101 performs the symbol recognition process of this entered curved figure to output a recognition result "a" as the recognition result (steps V10 and V11 of FIG. 16).

The symmetry shape judging unit 11 judges as to whether or not the recognition result "a" is equal to a symbol of a symmetry shape (step V12). This judgment is carried out by referring to the symbol table 102. This symbol table 102 defines a classification of a symmetry symbol and an asymmetry symbol. At this time, if the above-explained symbol is not equal to the symmetry shape, then the recognition processing unit 101 outputs this recognition result "a" as the recognition result (step V19).

To the contrary, in the case that the symmetry shape judging unit 111 judges that the above-described symbol is equal to the symmetry shape, the input image is symmetrically converted by the symmetry converting unit 103 (step V13). Next, the symmetry-converted image is again recognized by the recognition processing unit 101. As a result of this recognition, another recognition result "b" is obtained (steps V14 and V15). Subsequently, the comparing circuit 112 performs the comparison operation as to whether or not the recognition result "a" is made coincident with the recognition result "b" (step V16). When the recognition result "a" is made coincident with the recognition result "b", the recognition processing unit 101 outputs this recognition result "b" as the result thereof. Conversely, when the recognition result "a" is not made coincident with the recognition result "b", this recognition processing unit 101 rejects the input image data as "judgment impossible" (step V18).

As previously described, in accordance with the above-described conventional point symmetry shaping apparatus used for the curved figure, the input image data is symmetrically converted, and thereafter the symmetrically converted image data is again recognized under such an assumption that when the recognition result of the image under recognition is equal to the symmetry shape symbol, this image under recognition itself owns the symmetry. Only when it is judged that the recognition result "a" is made coincident with the recognition result "b", this input image is recognized as the recognition result "b".

However, this conventional point symmetry shaping apparatus used for the curved figure owns the following problem. That is, since all of the figures which are wanted to be judged as the symmetry figures must be defined in the symbol table 102, in such a case that one symmetry figure not defined in this symbol table 102 is entered into this conventional point symmetry shaping apparatus, this newly entered symmetry figure cannot be judged as a "symmetry figure".

SUMMARY OF THE INVENTION

The present invention has been made to solve the above-explained problem, and therefore, has an object to provide a point symmetry shaping method used for a curved figure and a point symmetry shaping apparatus thereof, capable of shaping an input curved figure having an arbitrary curved shape in such a way that the input arbitrary curved figure is arranged at a symmetry center automatically extracted from this input figure in a point symmetry manner.

Another object of the present invention is to provide a point symmetry shaping method used for a curved figure and a point symmetry shaping apparatus used thereof, capable of producing such a curved figure which is drawn by a user who has no excessive intention about a point symmetry, and also is located with respect to a symmetry center of this curved figure. This symmetry center is automatically extracted from this user-drawn curved figure.

Furthermore, another object of the present invention is to provide such a point symmetry shaping method used for a curved figure and such a point symmetry shaping apparatus thereof, having high processing speeds of the shaping operation by judging as quickly as possible such that an input curved figure having no symmetry is not equal to a point symmetry figure.

In addition, a further object of the present invention is to provide such a point symmetry shaping method used for a curved figure and also such a point symmetry shaping apparatus thereof, capable of setting an allowable range while a point symmetry of an input curved figure is judged.

To achieve the above-described objects, a point symmetry shaping apparatus of a curved figure, according to a first aspect of the present invention, is featured by comprising:

feature point calculating means for calculating a plurality of feature points from a coordinate point series for tracing a trial of an input curved figure to thereby obtain the feature points of the input curved figure;

symmetry-judging-line-segment calculating grid producing means for producing a grid capable of involving the input curved figure based upon the feature points calculated by the feature point calculating means;

symmetry-judging-line-segment calculating means for calculating a set of the feature points and a set of intersection points between a curved line of the curved figure and the grid by tracing the feature points and the intersection points between the curved line and the grid from one of the plural feature points, and also for connecting the respective sets of the feature points to the respective sets of the intersection points by way of straight lines so as to produce a symmetry-judging-line-segment used to judge a point symmetry of the input curved figure;

judging line center point calculating means for calculating a coordinate value of a center point of the symmetry-judging-line-segment calculated by the symmetry-judging-line-segment calculating means;

first point symmetry center candidate point calculating means for calculating a coordinate point which constitutes a symmetry center candidate point from all of the center points calculated by the center point of symmetry-judging-line-segment calculating means;

first point symmetry center candidate point/center point distance calculating means for calculating a distance between the symmetry center candidate point and the center point of the symmetry-judging-line-segment;

point symmetry judging means for judging a point symmetry of the input curved figure in such a manner that a calculation is made of a fluctuation value contained in the distances between the symmetry center candidate point and the center points of the symmetry-judging-line-segments, calculated by the first center candidate point/center point calculating means, and the calculated fluctuation value is compared with a threshold value; and point symmetrizing processing means for correcting the coordinate values of the set of the intersection points between the curved line of the input curved figure and the grid, and also the coordinate values of the feature points in order to shape such an input curved figure having a point symmetry judged by the point symmetry judging means in such a manner that the input curved figure having the point symmetry is positioned in a point symmetry manner with respect to the point symmetry center candidate point.

Also, a point symmetry shaping apparatus of a curved figure, according to a second aspect of the present invention, is featured by comprising:

feature point calculating means for calculating a plurality of feature points from a coordinate point series for tracing a trail of an input curved figure to thereby obtain the feature points of the input curved figure;

symmetry-judging-line-segment calculating grid producing means for producing a grid capable of involving the input curved figure based upon the feature points calculated by the feature point calculating means;

symmetry-judging-line-segment calculating means for calculating a set of the feature points and a set of intersection points between a curved line of the curved figure and the grid by tracing the feature points and the intersection points between the curved line and the grid from one of the plural feature points, and also for connecting the respective sets of the feature points to the respective sets of the intersection points by way of straight lines so as to produce a symmetry-judging-line-segment used to judge a point symmetry of the input curved figure;

judging line center point calculating means for calculating a coordinate value of a center point of the symmetry-judging-line-segment calculated by the symmetry-judging-line-segment calculating means;

second point symmetry center candidate point calculating means for calculating a coordinate value of a center of a circumscribed rectangular shape of the input curved figure as a point symmetry center candidate point which constitutes a symmetry center candidate point;

second point symmetry center candidate point/center point distance calculating means for calculating a distance between the point-symmetry center candidate point and the center point of the symmetry-judging-line-segment;

point symmetry judging means for judging a point symmetry of the input curved figure in such a manner that a calculation is made of a fluctuation value contained in the distances between the point-symmetry center candidate point and the center points of the symmetry-judging-line-segments, calculated by the second center candidate point/center point calculating means, and the calculated fluctuation value is compared with a threshold value; and point symmetrizing processing means for correcting the coordinate values of the set of the intersection points between the curved line of the input curved figure and the grid, and also the coordinate values of the feature points in order to shape such an input curved figure having a point symmetry judged by the point symmetry judging means in such a manner that the input curved figure having the point symmetry is positioned in a point symmetry manner with respect to the point symmetry center candidate point.

Additionally, a point symmetry shaping method of a curved figure, according to a third aspect of the present invention, is featured by comprising:

a step for calculating a plurality of feature points from a coordinate point series for tracing a trail of an input curved figure to thereby obtain the feature points of the input curved figure;

a step for producing a grid capable of involving the input curved figure based upon the feature points calculated by the feature point calculating step;

a step for calculating a set of the feature points and a set of intersection points between a curved line of the curved figure and the grid by tracing the feature points and the intersection points between the curved line and the grid from one of the plural feature points, and also for connecting the respective sets of the feature points to the respective sets of the intersection points by way of straight lines so as to produce a symmetry-judging-line-segment used to judge a point symmetry of the input curved figure;

a step for calculating a coordinate value of a center point of the symmetry-judging-line-segment calculated by the symmetry-judging-line-segment calculating step;

a first point-symmetry center candidate point calculating step for calculating a coordinate point which constitutes a symmetry center candidate point from all of the center points calculated by the center point of symmetry-judging-line-segment calculating step;

a first point symmetry center candidate point/center point distance calculating step for calculating a distance between the symmetry center candidate point and the center point of the symmetry-judging-line-segment;

a step for judging a point symmetry of the input curved figure in such a manner that a calculation is made of a fluctuation value contained in the distances between the symmetry center candidate point and the center points of the symmetry-judging-line-segments, calculated by the first center candidate point/center point calculating step, and the calculated fluctuation value is compared with a threshold value; and a step for correcting the coordinate values of the set of the intersection points between the curved line of the input curved figure and the grid, and also the coordinate values of the feature points in order to shape such an input curved figure having a point symmetry judged by the point symmetry judging means in such a manner that the input curved figure having the point symmetry is positioned in a point symmetry manner with respect to the point symmetry center candidate point.

Furthermore, a point symmetry shaping method of a curved figure, according to a fourth aspect of the present invention, is featured by comprising:

a step for calculating a plurality of feature points from a coordinate point series for tracing a trail of an input curved figure to thereby obtain the feature points of the input curved figure;

a step for producing a grid capable of involving the input curved figure based upon the feature points calculated by the feature point calculating step;

a step for calculating a set of the feature points and a set of intersection points between a curved line of the curved figure and the grid by tracing the feature points and the intersection points between the curved line and the grid from one of the plural feature points, and also for connecting the respective sets of the feature points to the respective sets of the intersection points by way of straight lines so as to produce a symmetry-judging-line-segment used to judge a point symmetry of the input curved figure;

a step for calculating a coordinate value of a center point of the symmetry-judging-line-segment calculated by the symmetry-judging-line-segment calculating step;

a second point-symmetry center candidate point calculating step for calculating a coordinate value of a center of a circumscribed rectangular shape of the input curved figure as a point-symmetry center candidate point which constitutes a symmetry center candidate point;

a second point symmetry center candidate point/center point distance calculating step for calculating a distance between the point symmetry center candidate point and the center point of the symmetry-judging-line-segment;

a step for judging a point symmetry of the input curved figure in such a manner that a calculation is made of a fluctuation value contained in the distances between the point-symmetry center candidate point and the center points of the symmetry-judging-line-segments, calculated by the second center candidate point/center point calculating step, and the calculated fluctuation value is compared with a threshold value; and a step for correcting the coordinate values of the set of the intersection points between the curved line of the input curved figure and the grid, and also the coordinate values of the feature points in order to shape such an input curved figure having a point symmetry judged by the point symmetry judging means in such a manner that the input curved figure having the point symmetry is positioned in a point symmetry manner with respect to the point symmetry center candidate point.

Also, the point symmetry shaping apparatus used for the curved figure, according to the first and second aspects of the present invention, is featured by further comprising judging-line-segment-validity judging means for judging the point symmetry of the input curved figure based upon the distance calculated by the first center candidate point/center point calculating means, and for supplying the point symmetry judging result to the point symmetry judging means.

Also, the point symmetry shaping apparatus used for the curved figure, according to the first and second aspects of the present invention, is featured by further comprising grid size instructing means for instructing a size of the grid produced by the symmetry-judging-line-segment calculating grid producing means so as to control judging precision of the point symmetry of the input curved figure.

Also, the point symmetry shaping apparatus used for the curved figure, according to the first and second aspects of the present invention, is featured by that the point symmetry judging means calculates an average value as the fluctuation value contained in the distances calculated by the first point symmetry center candidate point/center point distance calculating means, or the second point symmetry center candidate point/center point distance calculating means center candidate point/center point distance calculating means.

Also, the point symmetry shaping apparatus used for the curved figure, according to the first and second aspects of the present invention, is featured by that the point symmetry judging means calculates variance as the fluctuation value contained in the distances calculated by the first point symmetry center candidate point/center point distance calculating means, or the second point symmetry center candidate point/center point distance calculating means center candidate point/center point distance calculating means.

Also, the point symmetry shaping apparatus used for the curved figure, according to the first and second aspects of the present invention, is featured by that the point symmetry judging means calculates a median as the fluctuation value contained in the distances calculated by the second point symmetry center candidate point/center point distance calculating means. Moreover, the point symmetry shaping method used for the curved figure, according to the third and fourth aspects of the present invention, is featured by that the feature point calculating step calculates a coordinate value of a vertex of the input curved figure, a maximal point of the input curved figure, and a minimal point of the input curved figure along a horizontal direction and a vertical direction and the plural feature points.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Now, various preferred embodiments of the present invention will be described in detail.

Arrangement of First Point Symmetry Shaping Apparatus used for Curved Figure

Figure 1:
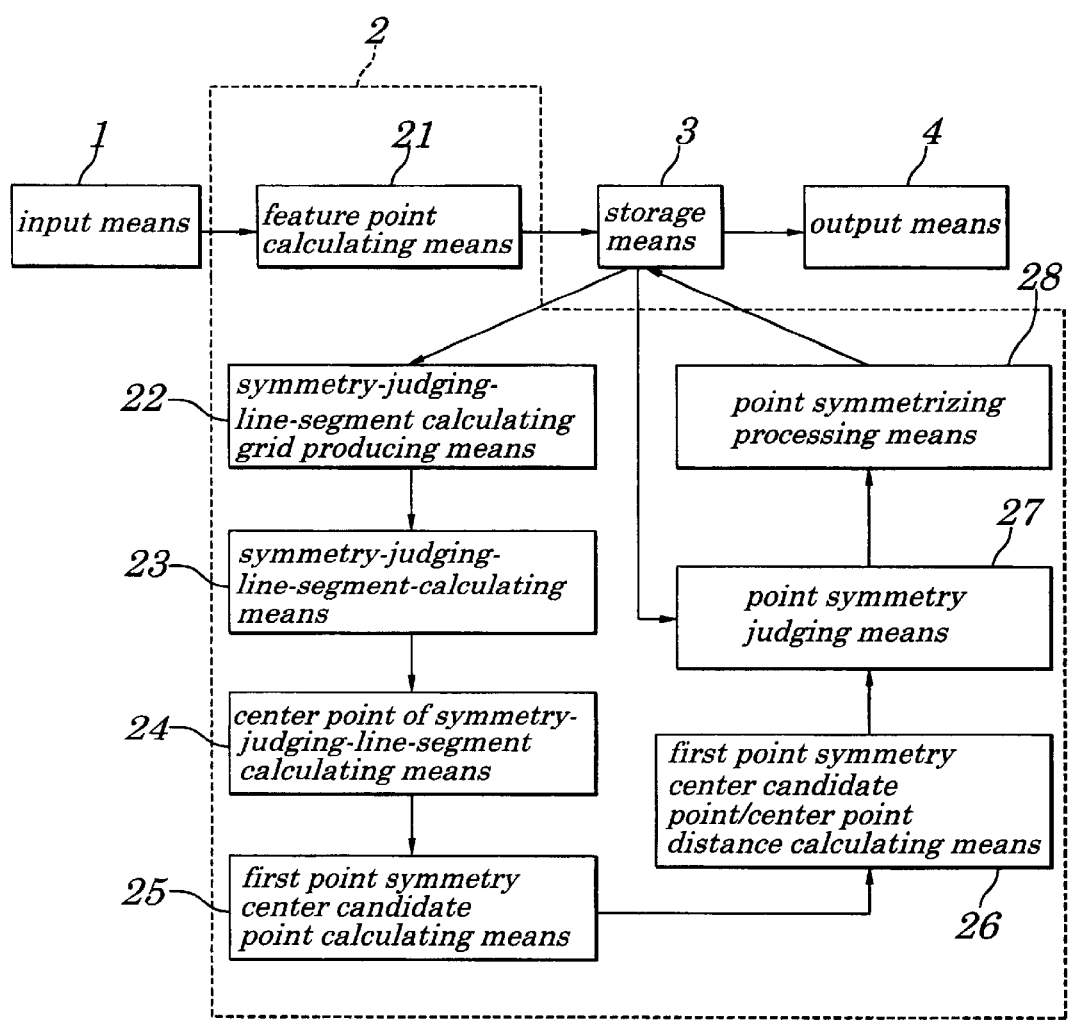
FIG. 1 is a schematic block diagram for showing an arrangement of a point symmetry shaping apparatus according to a first embodiment mode of the present invention.

FIG. 1 schematically indicates an arrangement of a point symmetry shaping apparatus used for a curved figure, according to a first embodiment mode of the present invention. As shown in FIG. 1, this first point symmetry shaping apparatus is arranged by input means 1, a data processing apparatus 2, storage means 3, and output means 4. The input means 1 inputs a curved figure by using a keyboard, a mouse, and a pen. The data processing apparatus 2 is operated under control of a program. The storage means 3 stores figure information and a feature point. The output means 4 is realized by a display apparatus and a printer.

The data processing apparatus 2 is constructed of a feature point calculating means 21, a symmetry-judging-line-segment calculating grid producing means 22, a symmetry-judging-line-segment calculating means 23, a center point symmetry-judging-line-segment calculating means 24, a first point symmetry center candidate point calculating means 25, a first point symmetry center candidate point/ center point distance calculating means 26, a point symmetry judging means 27, and a point symmetrizing processing means 28.

A detailed arrangement of the above-explained data processing apparatus 2 will be then described. A curved figure entered from the input means 1 is stored via the data processing apparatus 2 into the storage means 3 as a coordinate point series for tracing a trail of a curved line. In other words, the feature point calculating means 21 employed in the data processing apparatus 2 calculates a coordinate value of a vertex, a maximal point and a minimal point along a horizontal direction and a vertical direction from the entered coordinate point series of the above-described input curved figure. This feature point calculating means 21 stores these calculated values as the feature points of the input curved figure into the storage means 3. It should be understood that the curved figure and the feature points which are stored in the storage means 3, are related to each other.

Next, the symmetry-judging-line-segment calculating grid producing means 22 produces a square grid from the input coordinate point series stored in the storage means 3 in such a manner that this square grid involves the input curved figure. The symmetry-judging-line-segment calculating means 23 calculates a set of the above-described figure points and also a set of intersection points between the grid and the curved line in order to judge a point symmetry of the above-described input curved figure by tracing feature points, and intersection points between curved lines and grids from one of the above-described features. Then, this symmetry-judging-line-segment calculating means 23 connects the set of the above-described feature points with the set of the intersection points by using a straight line to define this straight line as a symmetry-judging-line-segment. The center point of symmetry-judging-line-segment calculating means 24 calculates a coordinate value of a center point of the above-described symmetry-judging-line-segment which is calculated by the symmetry-judging-line-segment calculating means 23.

The first point symmetry center candidate point calculating means 26 calculates a coordinate point of a symmetry candidate point (center point) from all of the center points calculated in the center point of symmetry-judging-line-segment calculating means 24. The first point symmetry center candidate point/center point distance calculating means 26 calculates a distance between a symmetry center candidate point and a center point of a symmetry-judging-line-segment. The point symmetry judging means 27 calculates a fluctuation contained in values of distances between the symmetry center candidate point and the center points of the symmetry-judging-line-segments calculated in the first point symmetry center candidate point/center point distance calculating means 26, so that this point symmetry judging means 27 judges the point symmetry of the above-described input curved figure.

The point symmetrizing processing means 28 changes the set of the feature points, and also the coordinate value of the set between the curved line and the grid as to the input curved figure which is judged by the point symmetry judging means 27 such that this input curved figure owns the point symmetry in such a manner that this input curved figure becomes a point-symmetry figure with respect to the above-described symmetry center candidate point. The produced figure is stored into the storage means 3. The produced figure is outputted to the output means 4 as an approximate curved line such that the shaped intersection point and the shaped feature point constitute a feature point of an approximate curved line (for example, a spline curve).

Operations of First Point Symmetry Shaping Apparatus used for Curved Figure

Operations of the point symmetry shaping apparatus used for the curved figure according to the first embodiment will be explained with reference to FIG. 1 to FIG. 6.

Figure 2:
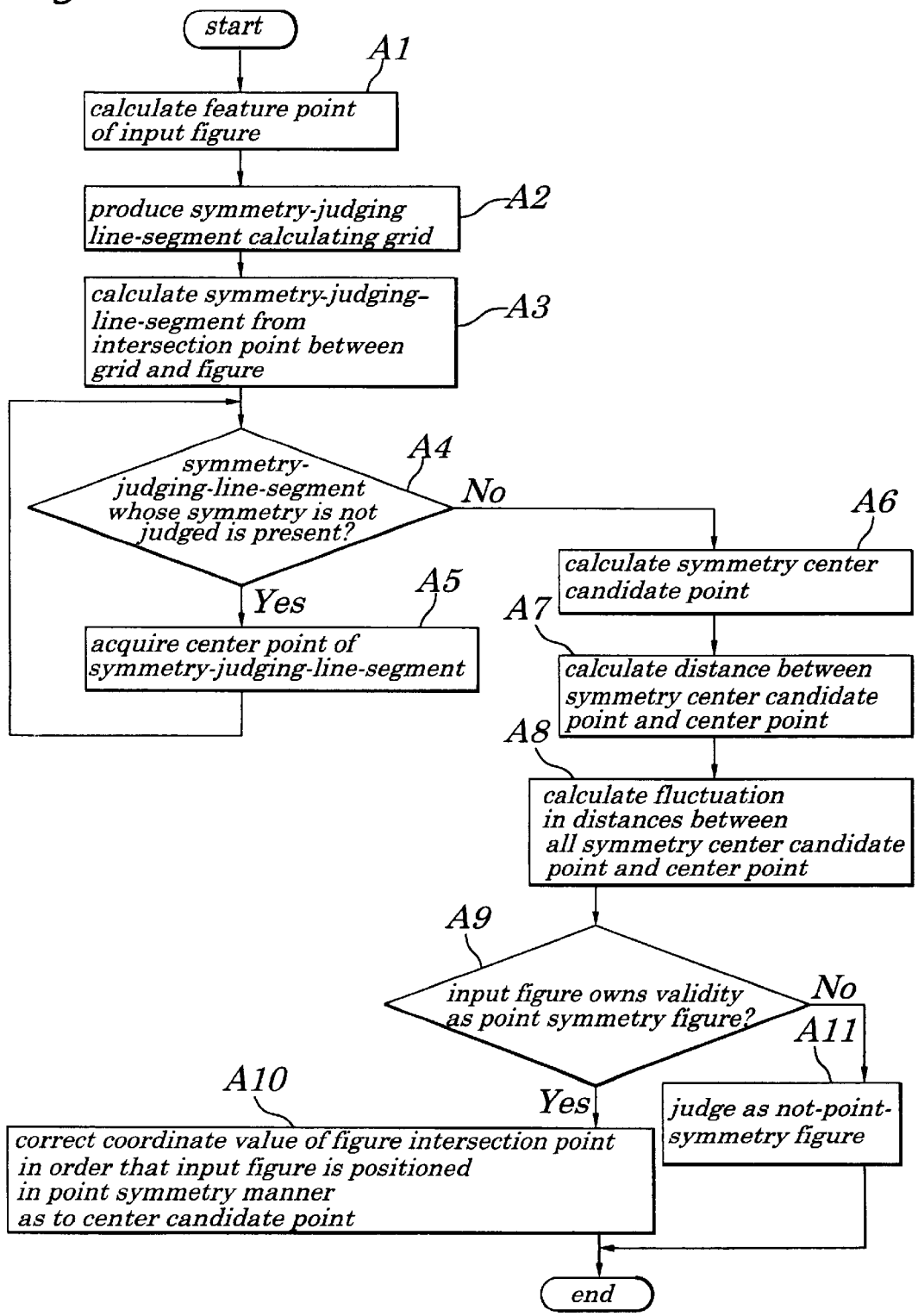
FIG. 2 is a flow chart for describing process operations of the point symmetry shaping apparatus according to the first embodiment mode.
Figure 3A:
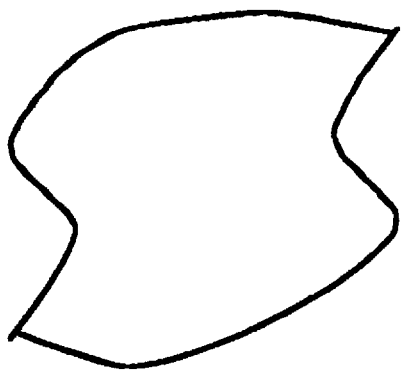
FIGS. 3(a) and 3(b) are illustrations of an example of an input curved figure and an output curved figure, which are used to explain the process operation of the point symmetry shaping apparatus according to the first embodiment mode.
Figure 3B:
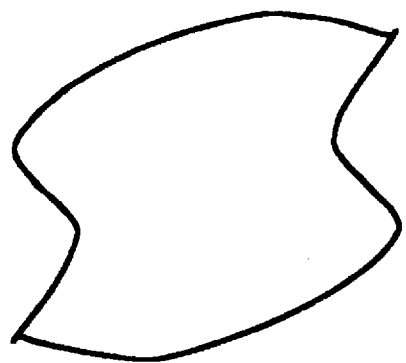
Figure 4:
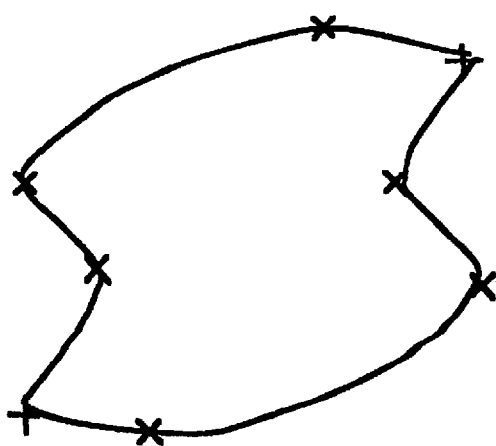
FIG. 4 is an illustration for showing an example of a feature point calculated in a feature point calculating means 21 employed in the point symmetry shaping apparatus of the first embodiment mode.
Figure 5:
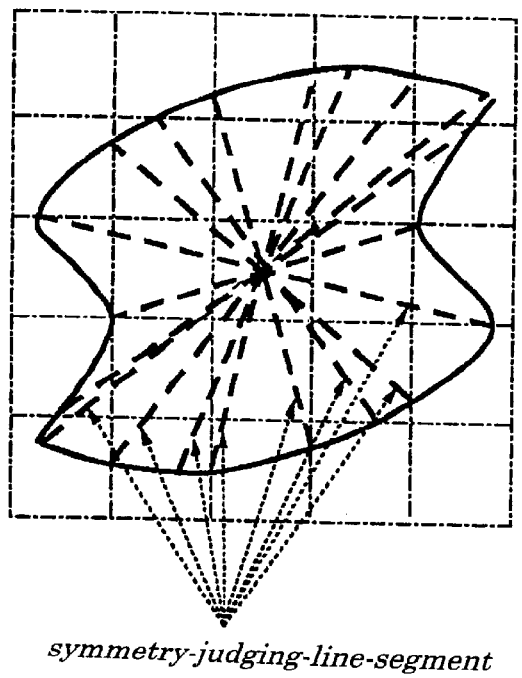
FIG. 5 illustratively represents an example of a grid produced from a symmetry-judging-line-segment calculating grid producing means 22, and also an example of a symmetry-judging-line-segment calculated from a intersection point between the grid and the input curved figure in the first embodiment mode.
Figure 6:
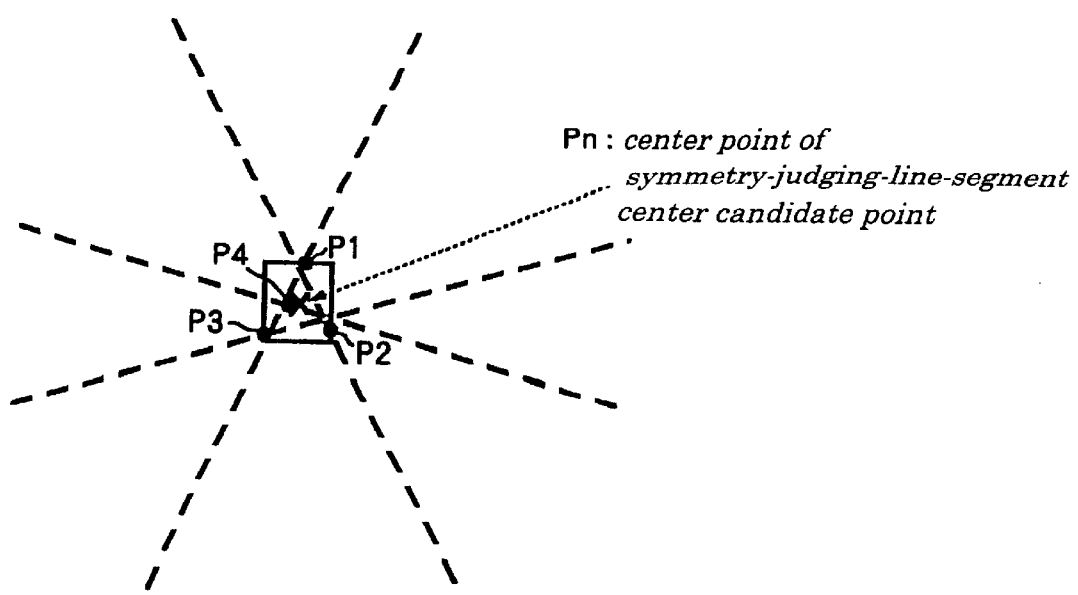
FIG. 6 illustratively indicates one example of a method for calculating a symmetry center candidate point, calculated by a first point-symmetry-center candidate point calculating means 25 employed in the first embodiment mode.

FIG. 3 is an illustration of an example of an input curved figure and an output curved figure, which are used to explain the process operation of the point symmetry shaping apparatus according to the first embodiment mode. FIG. 4 is an illustration for showing an example of a vertex, a maximal value, a minimal value, extracted as the feature points of the input curved figure. FIG. 5 illustratively represents an example of a grid produced from the symmetry-judging-line-segment calculating grid producing means 22, and also an example of a symmetry-judging-line-segment calculated from a intersection point between the grid and the input curved figure in the first embodiment mode. FIG. 6 illustratively indicates one example of a method for calculating a symmetry center candidate point. A curved figure entered from the input means 1 is stored into the storage means 3 as a coordinate point series for tracing a trail of a curved line. The feature point calculating means 21 employed in the data processing apparatus 2 calculates a coordinate value of a vertex, a maximal point and a minimal point along a horizontal direction and a vertical direction from the entered coordinate point series of the above-described input curved figure. The input curved figure is outputted to the output means (step A1 of FIG. 2).

Next, the symmetry-judging-line-segment calculating grid producing means 22 produces a square grid from the input coordinate point series stored in the storage means 3 in such a manner that this square grid involves the input curved figure. It should also be noted that the smaller an area of a grid, the more correct a symmetry can be judged (step A2 of FIG. 2, and see FIG. 5).

Subsequently, the symmetry-judging-line-segment calculating means 23 traces feature points in a right (left) direction along a series of input coordinate points from one of the feature points calculated by the feature point calculating means 21. At this time, in the case that a total number of feature points is equal to 2 m pieces (symbol "m"=1, 2, - - - ), assuming now that the above-described input curved figure may be symmetrically shaped by the point symmetry manner, an n-th feature point is connected with feature points traced by an (m+n)th feature point (symbol "n"=1, 2, - - - , m) by using a straight line.

Similarly, while tracing the intersection points between the grid produced by the symmetry-judging-line-segment calculating grid producing means 22 and the intersection points of the above-described input curved figure, a 0-th intersection point from a first feature point is connected to a 0-th intersection point from an m+1-th feature point by using a straight line. The line segments produced based upon these two different methods are defined as the symmetry-judging-line-segments (step A3 of FIG. 2, and see FIG. 5).

Next, the point symmetry judging means 27 judges as to whether or not such a symmetry-judging-line-segment whose symmetry is not yet judged is present (step A4 of FIG. 2). When such a symmetry-judging-line-segment is present, the center point of symmetry-judging-line-segment calculating means 24 calculates a coordinate value of a center point about this symmetry-judging-line-segment (step A5 of FIG. 2). While repeatedly performing the operation, the center points of all of the symmetry-judging-line-segments are calculated.

Subsequently, the first point symmetry center candidate point calculating means 25 calculates a coordinate point which constitutes the symmetry center candidate point from the center point of the above-described calculated symmetry-judging-line-segment (step A6 of FIG. 2, and see FIG. 6). As the calculation method, in the case that there are two sets of such symmetry-judging-line-segments, a coordinate of a intersection point between these two symmetry-judging-line-segments may be employed, and also a coordinate of a center point between the two center points of the calculated symmetry-judging-line-segments may be used. Alternatively, in the case that more than 3 symmetry-judging-line-segments are present, coordinate values of gravity centers of all center points, and further coordinate values of centers of all circumscribed rectangular shapes may be employed.

Subsequently, the first point symmetry center candidate point/center point distance calculating means 26 calculates a distance between the above-described symmetry candidate point and a center point of each of the symmetry-judging-line-segments (step A7 of FIG. 2). After the distances between the symmetry center candidate point and all of the center points of the symmetry-judging-line-segments have been calculated as to all of the symmetry-judging-line-segments, the point symmetry judging means 27 calculates a fluctuation contained in the calculated distances (step A8 of FIG. 2). As the calculation method, for instance, there is one method for calculating an average value and variance. When a calculated value is smaller than, or equal to a certain constant threshold value, the point symmetry judging means 27 may judge that an input curved figure owns a point symmetry with respect to the above-described symmetry center candidate point (step A9 of FIG. 2). In other words, when either the average method or the dispersion method is utilized, the closer the calculated value is approximated to 0, the higher the symmetry of the input curved figure becomes, which implies the point symmetry figure.

In the case that the point symmetry judging means 27 judges such a fact that the input curved figure owns the point symmetry, the point symmetrizing processing means 28 corrects the feature points and the coordinate values of the intersection points in such a manner that both each set of the feature points and each set of the intersection points between the input coordinate points and the grids may constitute the point symmetry with respect to the above-explained symmetry center candidate point. These sets of the feature points and also of the intersection points are calculated by the symmetry-judging-line-segment calculating means 23. Then, this point symmetrizing processing means 28 stores the corrected feature points and the corrected coordinate points of the intersection points (step A10 of FIG. 2). The shaped input figure is outputted from the output means as such an approximate curved line that the shaped feature points and the shaped intersection points become feature points of this approximate curved line (for instance, spline curve).

On the other hand, when the above-calculated fluctuation exceeds the constant threshold value, the point symmetry judging means 27 judges that this input curved figure does not have the point symmetry (step A11 of FIG. 2).

As previously explained in detail, the point symmetry shaping apparatus of the first embodiment automatically extracts such a symmetry center point from the curved figure entered by the user, and then may shape this input curved figure as such a point-symmetry figure with respect to this extracted symmetry center point.

Figure 7:
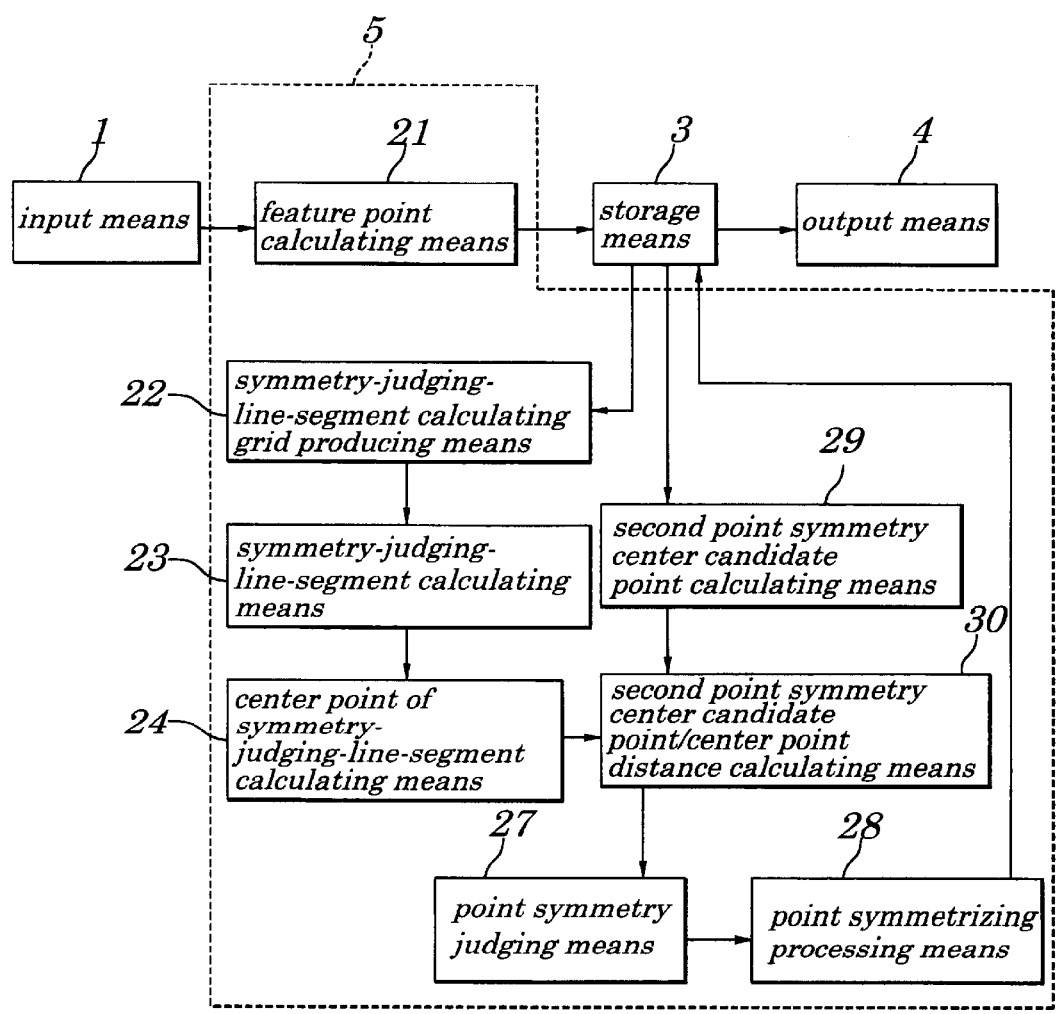
FIG. 7 is a schematic block diagram for indicating an arrangement of a point symmetry shaping apparatus according to a second embodiment mode of the present invention.

Apparent/Operations of Second Point Symmetry Shaping Apparatus used for Curved Figure A point symmetry shaping apparatus used for a curved figure, according to a second embodiment mode of the present invention, will be described. FIG. 7 is a schematic block diagram for indicating an arrangement of this second point symmetry shaping apparatus used for the curved figure. It should be noted that the same reference numerals indicated in FIG. 1 will be employed as those for denoting the same, or similar structural elements shown in FIG. 7, and descriptions thereof are omitted. The second point symmetry shaping apparatus of FIG. 7 owns the following different point, as compared with the first point symmetry shaping apparatus of FIG. 1. That is, a data processing apparatus 5 contains a second point symmetry center candidate point calculating means 29, instead of the above-described first point symmetry center candidate point calculating means 25, and a second point symmetry center candidate point/center point distance calculating means 30, instead of the above-mentioned first point symmetry center candidate point/center point distance calculating means 26, as compared with the arrangement of the data processing apparatus 2 according to the first embodiment.

Figure 8:
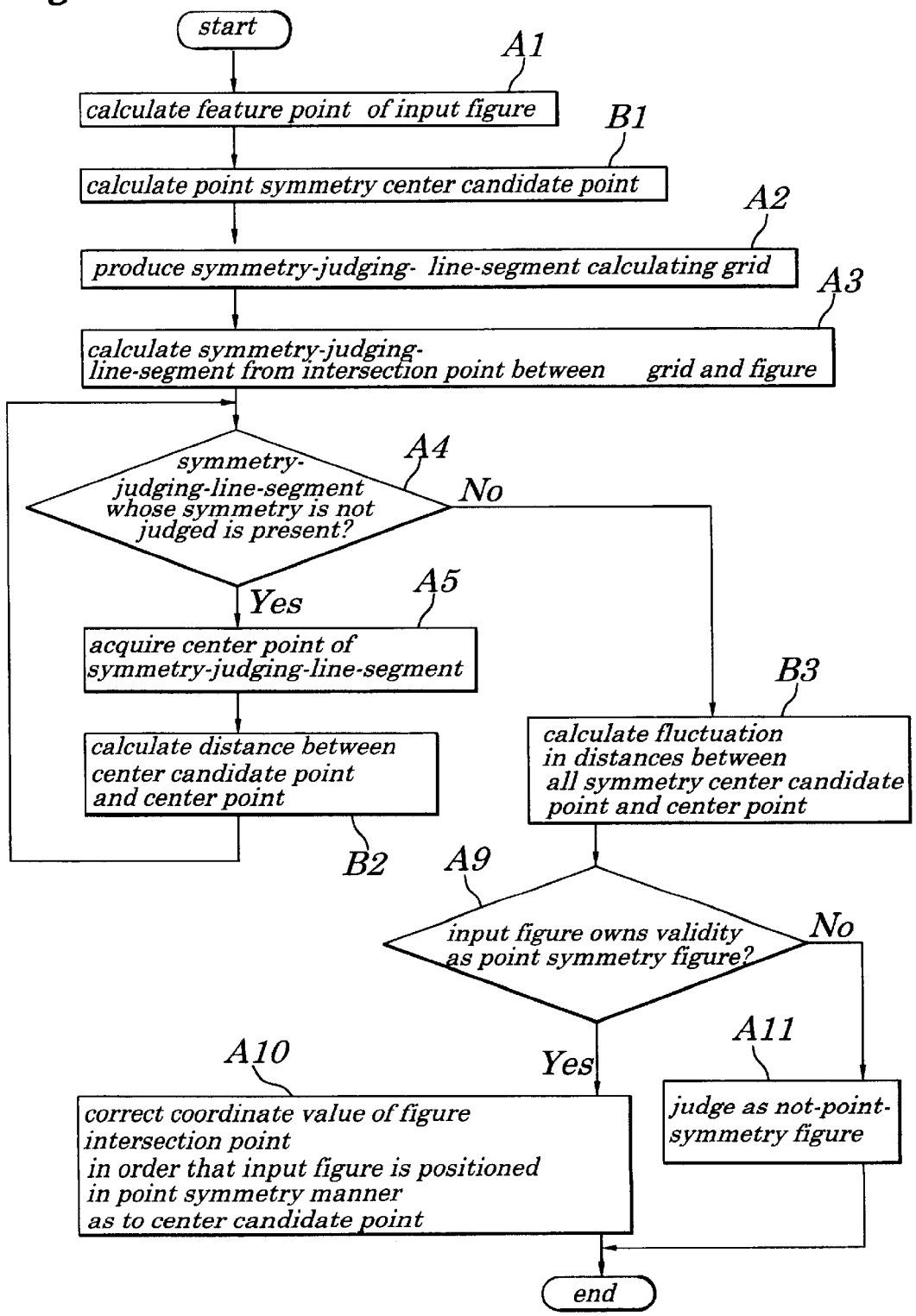
FIG. 8 is a flow chart for describing process operation of the point symmetry shaping apparatus according to the second embodiment mode.
Figure 9:
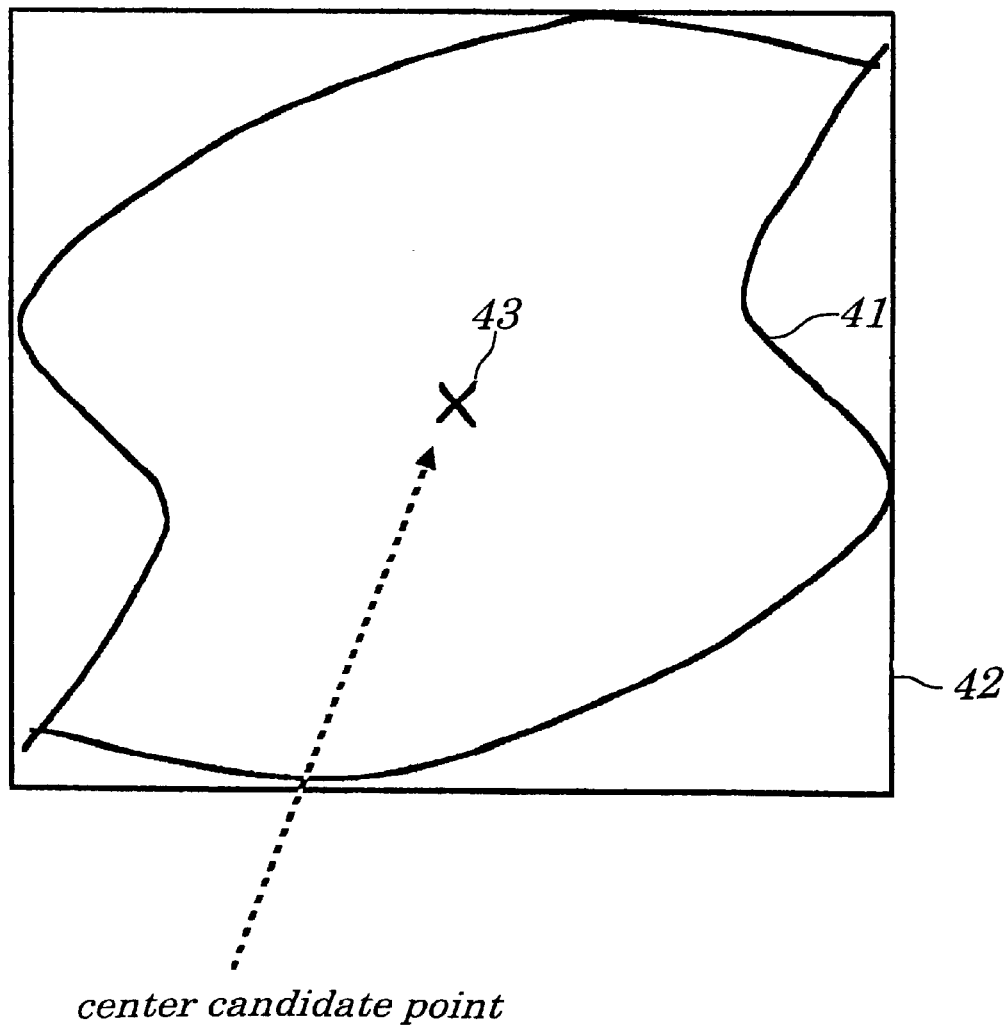
FIG. 9 illustratively shows one example of a method for calculating a symmetry center candidate point, calculated by a second point-symmetry center candidate point calculating means 29 employed in the second embodiment mode.

Next, operations of this point symmetry shaping apparatus for the curved figure, according to the second embodiment of the present invention, will be described with reference to FIG. 7 to FIG. 9. FIG. 8 is a flow chart for describing a process flow operation of the second point symmetry shaping apparatus. FIG. 9 illustratively indicates an example of a method for calculating a symmetry center candidate point according to the second embodiment. It should also be noted that the same step numbers shown in FIG. 2 will be employed as those for denoting the same process steps indicated in FIG. 8. Since the operations of the above-described feature point calculating means 21, symmetry-judging-line-segment calculating grid producing means 22, symmetry-judging-line-segment calculating means 23, judging-ling-segment center point calculating means 24, point symmetry judging means 27, and point symmetrizing processing means 28 are identical to those of the respective process operations of the first embodiment, detailed explanation thereof are omitted. These process operations are defined from the steps A1, A2 to A5, and A9 to A11 of FIG. 8.

When the feature point of the input curved figure is calculated in the feature point calculating means 21 employed in the data processing apparatus 5 of FIG. 7, the second point symmetry center point calculating means 29 subsequently produces a circumscribed rectangular shape of the input curved line figure, and then extracts a center point of this circumscribed rectangular shape as a symmetry center candidate point (step B1 of FIG. 8). In other words, as indicated in FIG. 9., this second point symmetry center candidate point calculating means 29 produces a circumscribed rectangular shape 42 of an input curved figure 43, and thereafter extracts a center point 43 of this circumscribed rectangular shape 42.

After the process operations defined at the above-explained steps A2, A3, A4 are carried out, the judging line segment point calculating means 24 calculates a center point of each of the symmetry-judging-line-segment at the step A5. Then, the second point symmetry center candidate point/center point distance calculating means 30 calculates a distance between the calculated center point of the symmetry-judging-line-segment and the symmetry center candidate point (step B2 of FIG. 8).

After the second point symmetry center candidate point/center point distance calculating means 30 calculates each of the distances between the center points and the symmetry center candidate point as to all of the symmetry-judging-line-segments, the point symmetry judging means 27 calculates a fluctuation contained in the calculated distances in a similar manner to that of the first embodiment (step B3 of FIG. 8). It should be understood that since the subsequent process operations defined after the steps A9 to the step A11 are similar to those of the first embodiment, descriptions thereof are omitted. In accordance with the point symmetry shaping apparatus of the second embodiment, it is possible to achieve a similar effect to that of the first embodiment even by employing the different arrangement from that of the first embodiment.

Figure 10:
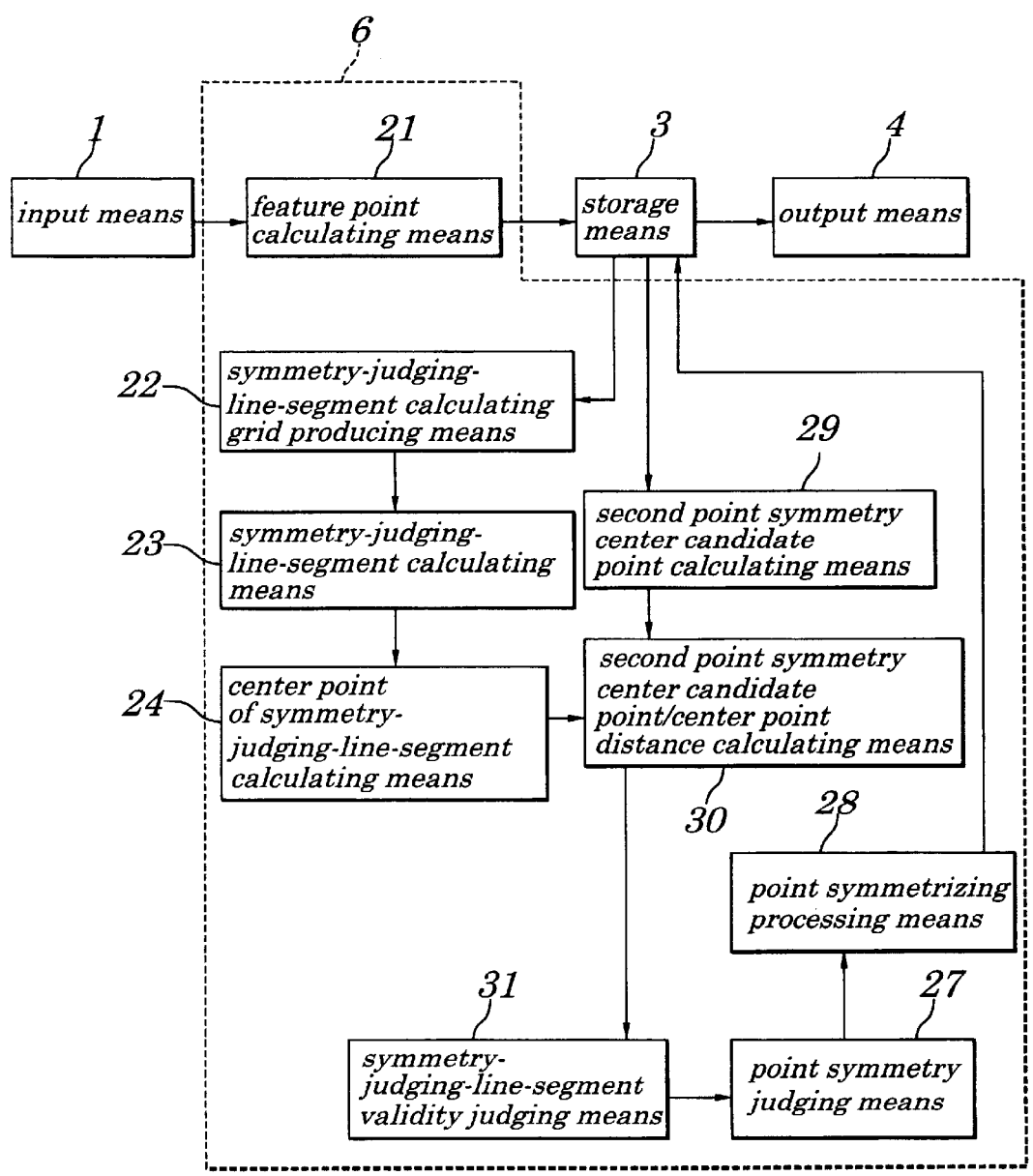
FIG. 10 is a schematic block diagram for indicating an arrangement of a point symmetry shaping apparatus according to a third embodiment mode of the present invention.

Arrangement/Operations of Third Point Symmetry Shaping Apparatus used for Curved Figure A point symmetry shaping apparatus used for a curved figure, according to a third embodiment mode of the present invention, will be described. FIG. 10 is a schematic block diagram for indicating an arrangement of this third point symmetry shaping apparatus used for the curved figure. It should be noted that the same reference numerals indicated in FIG. 1, or FIG. 7 will be employed as those for denoting the same, or similar structural elements shown in FIG. 10, and descriptions thereof are omitted. The third point symmetry shaping apparatus of FIG. 10 owns the following different point, as compared with the second point symmetry shaping apparatus of FIG. 7. That is, a data processing apparatus 6 contains symmetry-judging-line-segment validity judging means 31 interposed between the point symmetry judging means 27 and the second point symmetry center candidate point/center point distance calculating means 30, as compared with the arrangement of the data processing apparatus 5 according to the first embodiment.

Figure 11:
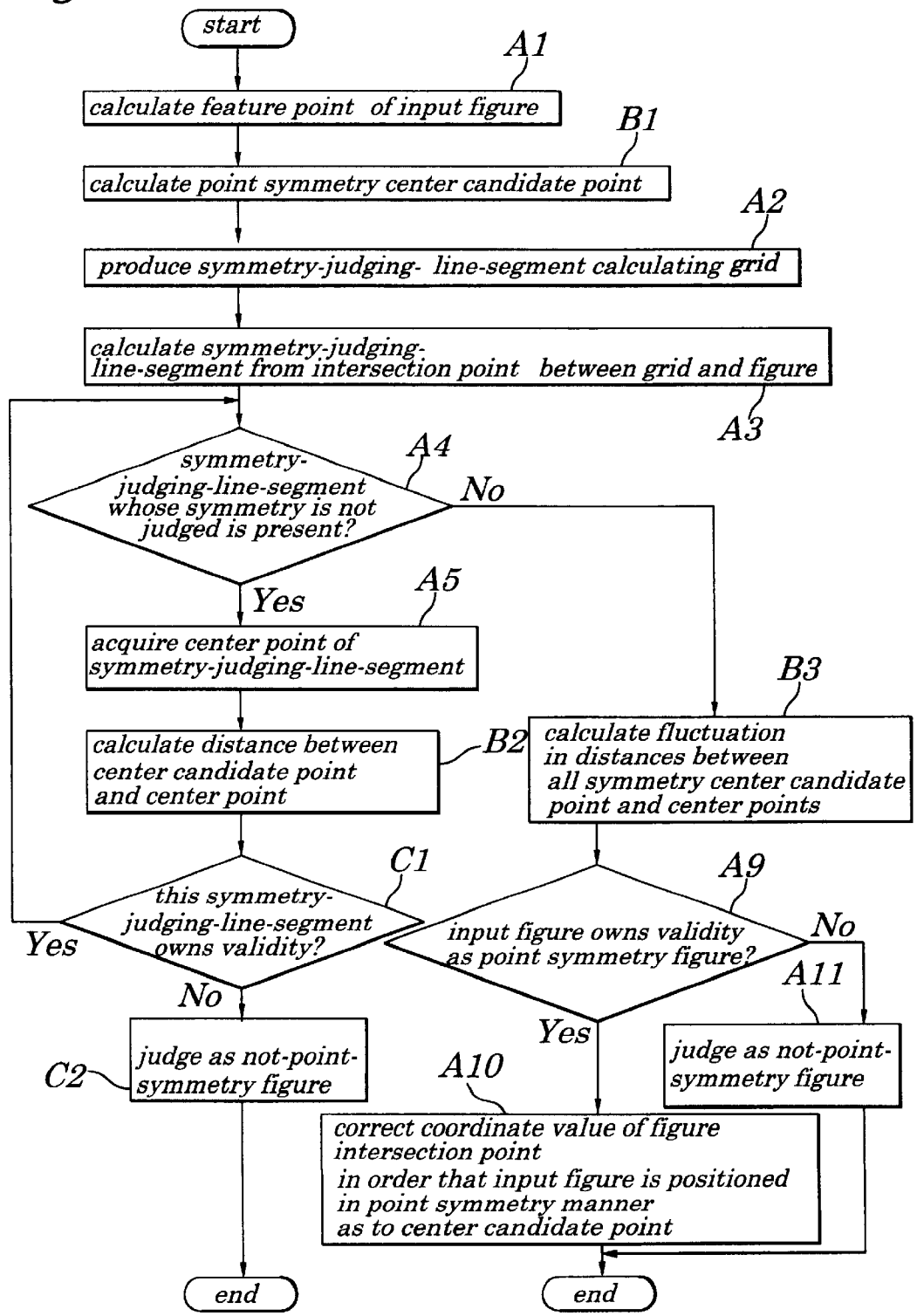
FIG. 11 is a flow chart for describing process operation of the point symmetry shaping apparatus according to the third embodiment mode.

Next, operations of this point symmetry shaping apparatus for the curved figure, according to the third embodiment of the present invention, will be described with reference to FIG. 10 and FIG. 11. FIG. 11 is a flow chart for describing a process flow operation of the third point symmetry shaping apparatus. It should also be noted that the same step numbers shown in FIG. 8 will be employed as those for denoting the same process steps indicated in FIG. 11. Since the operations of the above-described feature point calculating means 21, symmetry-judging-line-segment calculating grid producing means 22, symmetry-judging-line-segment calculating means 23, judging-ling-segment center point calculating means 24, second point symmetry center candidate point calculating means 29, second point symmetry center candidate point/center point distance calculating means 30, point symmetry judging means 27, and point symmetrizing processing means 28 are identical to those of the respective process operations of the second embodiment, detailed explanation thereof are omitted. These process operations are defined from the steps A1 to B2, and B3 to A11 of FIG. 11.

In the second embodiment, after the distances between the center points of all of the symmetry-judging-line-segments and the symmetry center candidate points are calculated with respect to the calculated symmetry center candidate points, the point symmetry judging means 27 judges as to whether or not the input curved figure owns the point symmetry as to the symmetry center candidate point. To the contrary, in accordance with this third embodiment, after a distance between a center point of one symmetry-judging-line-segment and the symmetry center candidate point is calculated (step B2 of FIG. 11), the symmetry-judging-line-segment validity judging means 31 judges as to whether or not each of the above-described calculated distance values exceeds a certain constant threshold value (namely, the respective calculated distance values own validity) (step C1 of FIG. 11).

In such a case that the distance between the center point of one symmetry-judging-line-segment and the symmetry center candidate point is involved in a range of a certain constance threshold value, the symmetry-judging-line-segment validity judging means 31 judges such a possibility that the input curved figure owns the point symmetry as to the symmetry center candidate point. Then, the process operation is returned to the step A4 of FIG. 11 at which the process operation is executed for a new symmetry-judging-line-segment. To the contrary, when the distance between the center point of one symmetry-judging-line-segment and the symmetry center candidate point exceeds the range of a certain constant value, this symmetry-judging-line-segment validity judging means 31 judges that the input curved figure does not own the point symmetry as to the symmetry center candidate point (step C2 of FIG. 11).

In accordance with the point symmetry shaping apparatus of the third embodiment, the judging process operation for such an input curved figure having no symmetry can be accomplished only by calculating the distance between the symmetry center candidate point and the center point of the symmetry-judging-line-segment. As a consequence, the processing speed of this third point symmetry shaping apparatus can be improved, as compared with that of the second embodiment.

Figure 12:
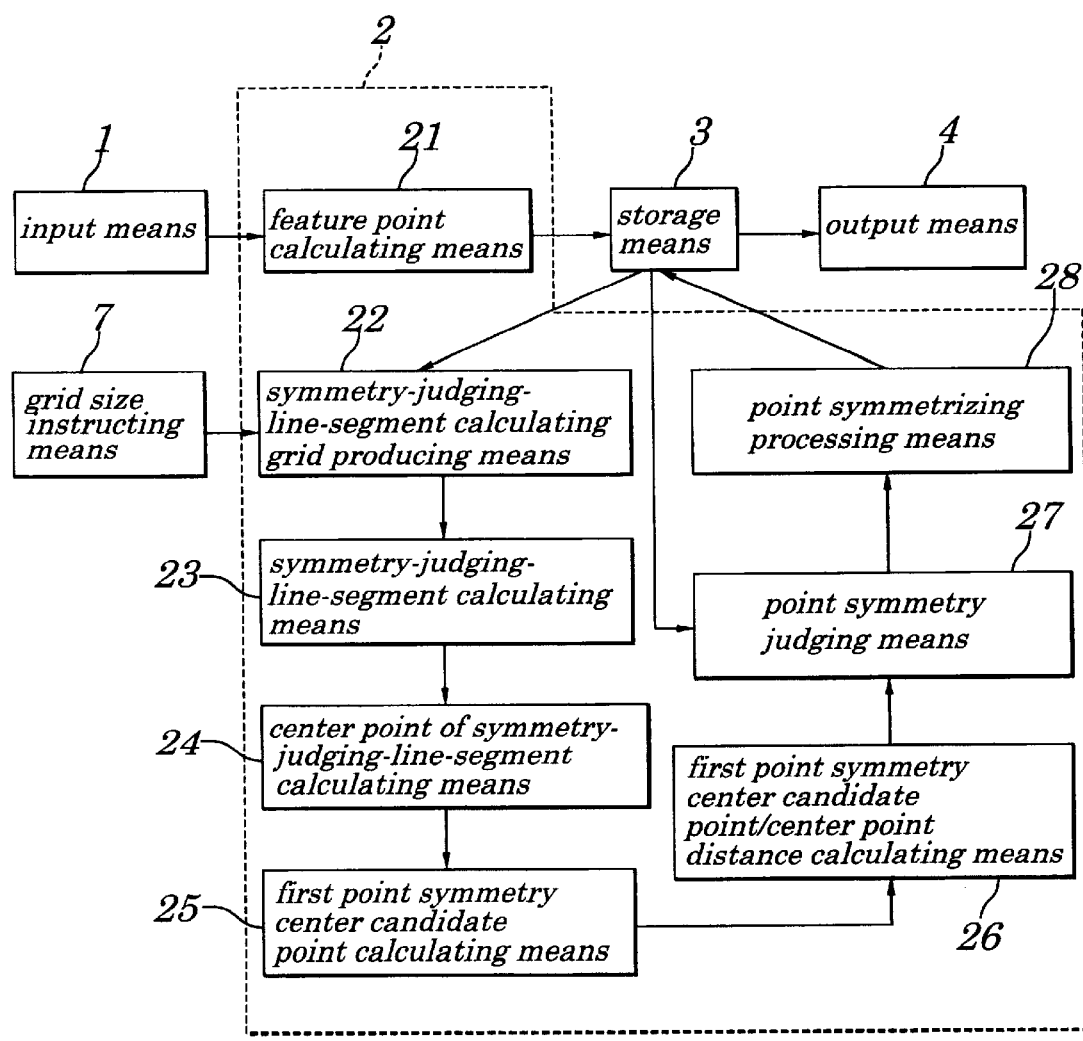
FIG. 12 is a schematic block diagram for indicating an arrangement of a point symmetry shaping apparatus according to a fourth embodiment mode of the present invention.

Arrangement/Operations of Fourth Point Symmetry Shaping Apparatus used for Curved Figure A point symmetry shaping apparatus used for a curved figure, according to a fourth embodiment mode of the present invention, will be described. FIG. 12 is a schematic block diagram for indicating an arrangement of this fourth point symmetry shaping apparatus used for the curved figure. It should be noted that the same reference numerals indicated in FIG. 1 will be employed as those for denoting the same, or similar structural elements shown in FIG. 12 and descriptions thereof are omitted. The fourth embodiment shown in FIG. 12 is featured by that a grid size instructing means 7 is connected with the data processing apparatus 2.

Figure 13:
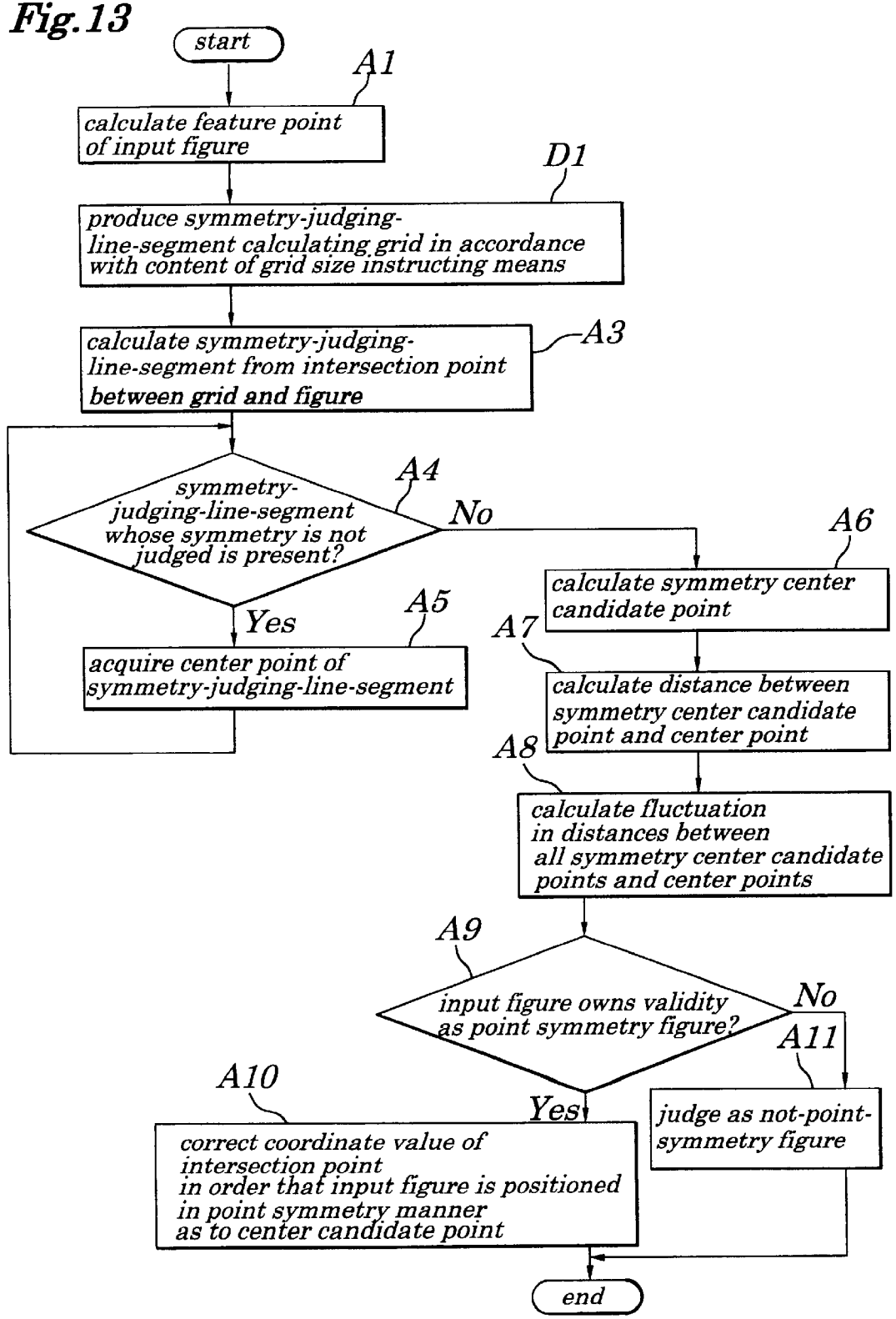
FIG. 13 is a flow chart for describing process operation of the point symmetry shaping apparatus according to the fourth embodiment mode.

Next, operations of this point symmetry shaping apparatus for the curved figure, according to the fourth embodiment of the present invention, will be described with reference to FIG. 12 and FIG. 13. FIG. 13 is a flow chart for describing a process flow operation of the fourth point symmetry shaping apparatus. It should also be noted that the same step numbers shown in FIG. 2 will be employed as those for denoting the same process steps indicated in FIG. 12. Since the operations of the above-described feature point calculating means 21, symmetry-judging-line-segment calculating means 23, center point of symmetry-judging-line-segment calculating means 24, first point symmetry center candidate point calculating means 25, first point symmetry center candidate point/center point distance calculating means 26, point symmetry judging means 27, and point symmetrizing processing means 28 are identical to those of the respective process operations of the first embodiment, detailed explanations thereof are omitted. These process operations are defined from the steps A1, and A3 to A11 of FIG. 13.

In this fourth point symmetry shaping apparatus, when a grid used to calculate a symmetry-judging-line-segment is produced by the symmetry-judging-line-segment calculating grid producing means 22, this symmetry-judging-line-segment calculating grid producing means 22 produces such a grid having a size instructed by the grid size instructing means 7 (step D1 of FIG. 13). As a method for instructing a size of a single grid by the grid size instructing means 7, there are a method for instructing a grid size by a user, a grid size instructing method by a random number, and a grid size instructing method for making the grid size directly proportional to a dimension of a figure.

The process operations defined after the above-described step D1 are described at steps A3 through A11, namely are identical those of the first embodiment. In accordance with the point symmetry shaping apparatus of this fourth embodiment, since the size of the grid used to calculate to symmetry-judging-line-segment is varied, the symmetry judging precision can be changed, and furthermore the processing speed of this fourth point symmetry shaping apparatus can be controlled. For instance, the narrower the interval of this grid becomes, the more the total number of the symmetry-judging-line-segments is increased. As a result, the total number of calculating the symmetry is increased and therefore the processing speed is lowered.

Figure 14:
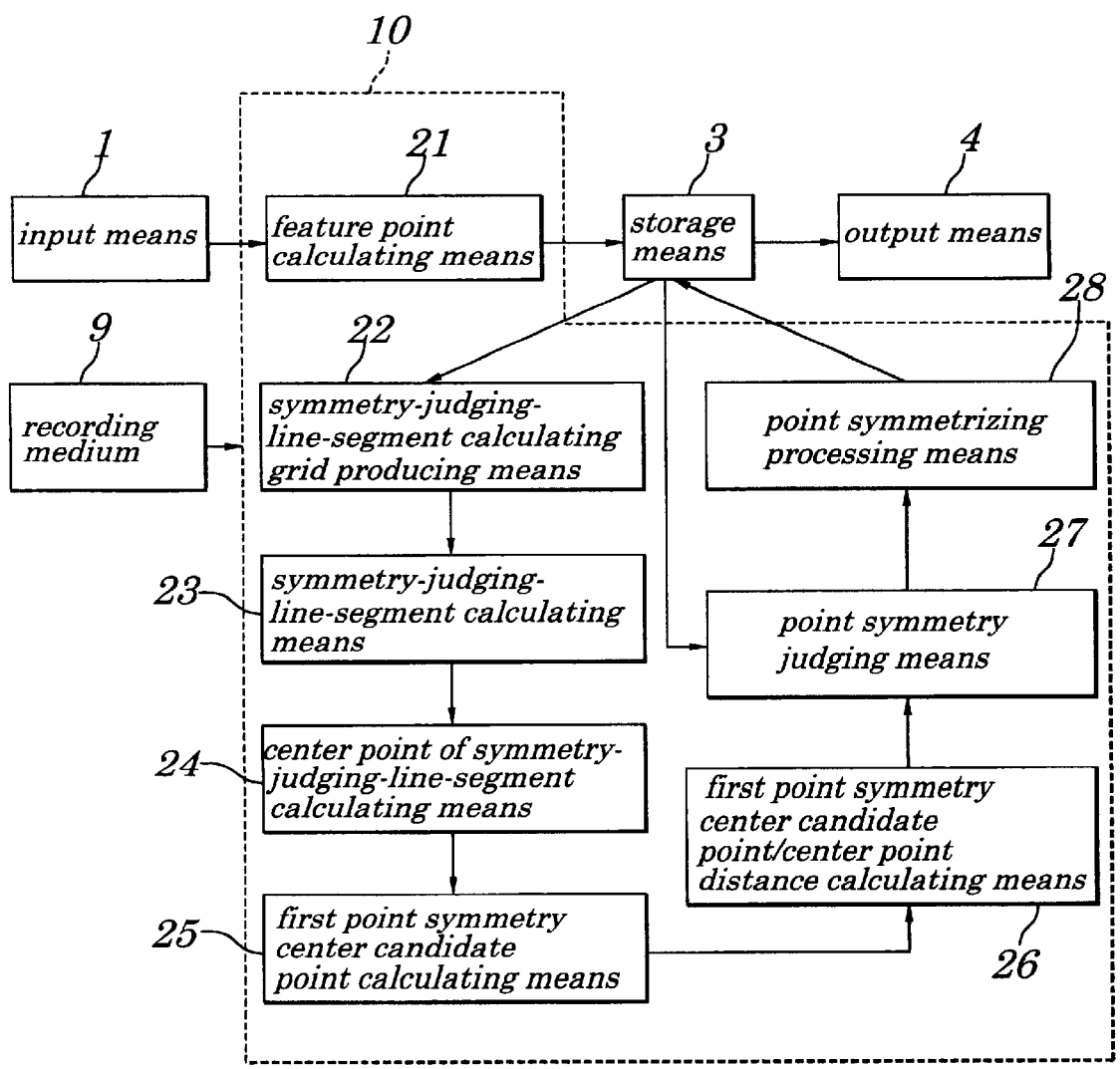
FIG. 14 is a schematic block diagram for indicating an arrangement of a point symmetry shaping apparatus according to a fifth embodiment mode of the present invention.
Figure 15:
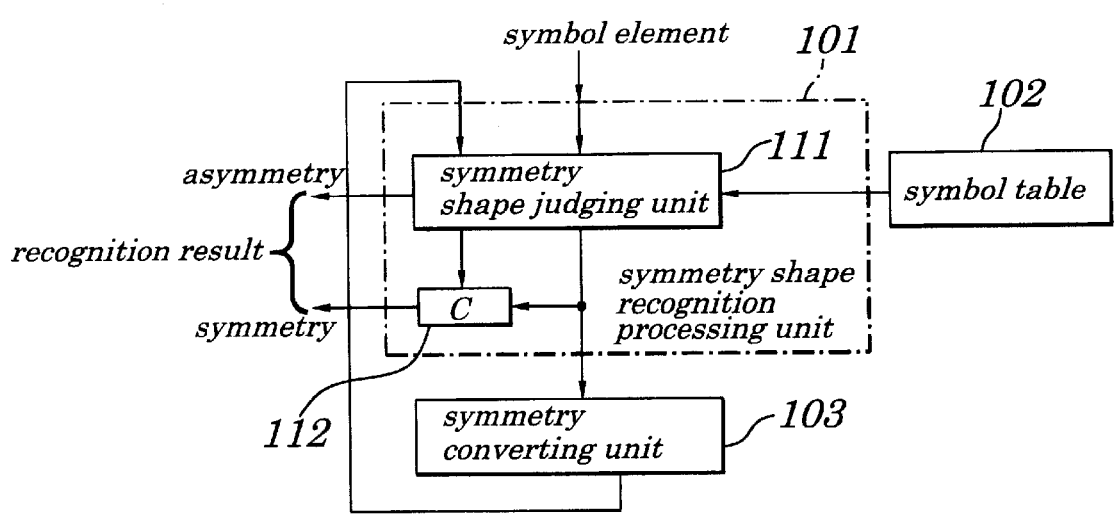
FIG. 15 is a schematic block diagram for indicating the arrangement of the conventional point symmetry shaping apparatus.
Figure 16:
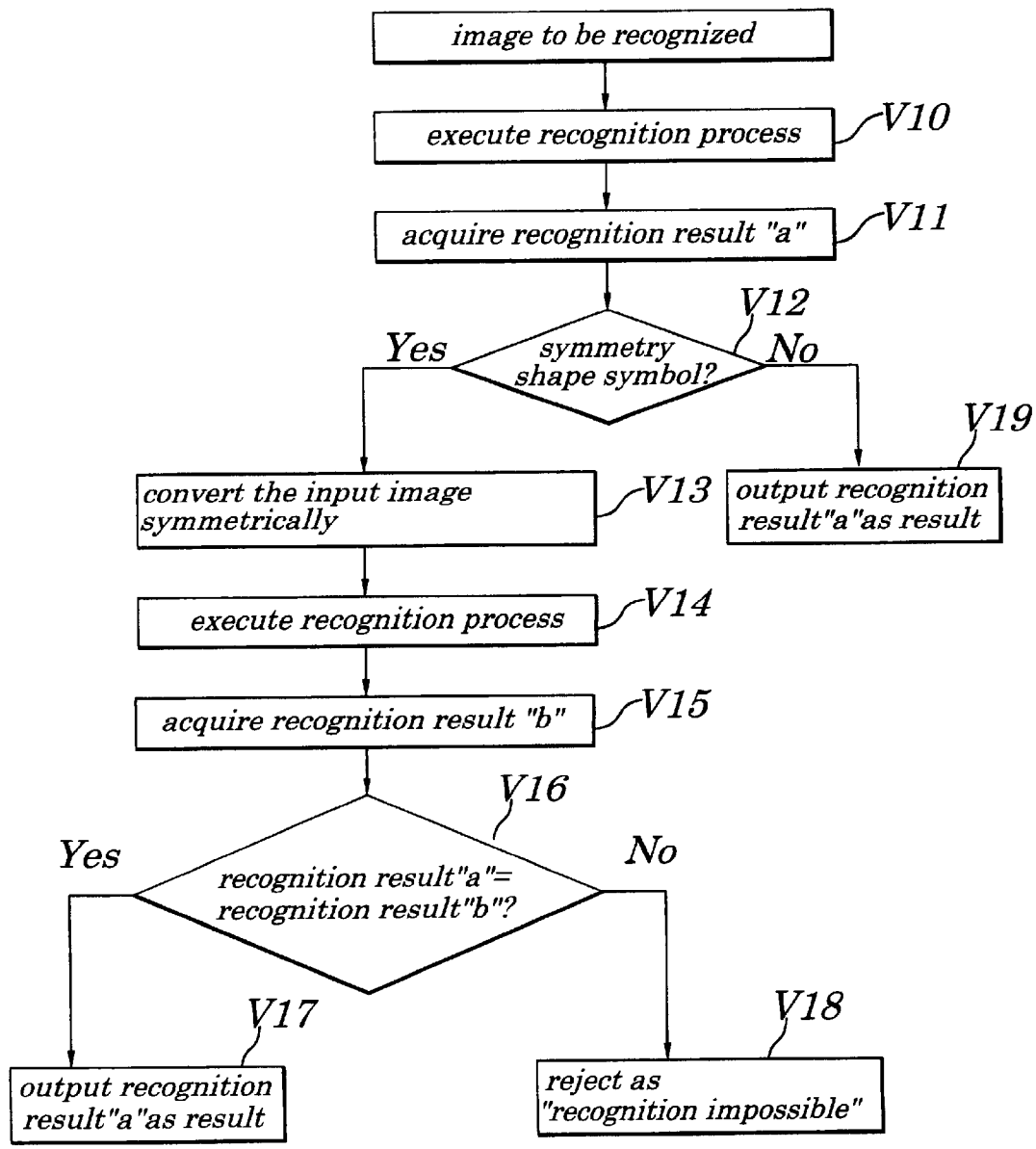
FIG. 16 is a flow chart for describing the process operation of the conventional point symmetry shaping apparatus.

Arrangement/Operations of Fifth Point Symmetry Shaping Apparatus used for Curved Figure A point symmetry shaping apparatus used for a curved figure, according to a fifth embodiment mode of the present invention, will be described. FIG. 14 is a schematic block diagram for indicating an arrangement of this fifth point symmetry shaping apparatus used for the curved figure. It should be noted that the same reference numerals indicated in FIG. 1 will be employed as those for denoting the same, or similar structural elements shown in FIG. 14, and descriptions thereof are omitted. A data processing apparatus 10 employed in this fifth point symmetry shaping apparatus of FIG. 14 is featured by that while all of the structural arrangements shown in FIG. 1 according to the first embodiment are used, point-symmetry-curved figure shaping program is read out from a recording medium 9 to be processed in this data processing apparatus 10. This recording medium 9 may be realized by a magnetic disk, a semiconductor memory, and other recording media.

In the fifth point symmetry shaping apparatus, the above-described point symmetry curved figure shaping program is read out from the recording medium 9 to be loaded on this data processing apparatus 10. Thus, this data processing apparatus 10 is operated under control of this program. That is, the data processing apparatus 10 executes the same process operations as those performed by the data processing apparatus 2 of the first embodiment under control of this point symmetry curved figure shaping program.

It should also be noted that two, or more apparatuses additionally provided in the above-described third, fourth and fifth embodiments may be combined with each of the arrangements according to the first embodiment and the second embodiment, A resulting in positively combined effects.

DETAILED POINT SYMMETRY SHAPING OPERATION OF CURVED FIGURE

Next, point symmetry shaping operation according to an embodiment belonging to the first point symmetry shaping apparatus of the present invention will be described in detail. A curved figure as illustrated in FIG. 3(*a*), entered from the input apparatus 1 is stored as an input coordinate point series into the storage means 3 in FIG. 1. The feature point calculating means 21 calculates a coordinate value of a vertex, a maximal point and a minimal point along horizontal direction and a vertical direction. This feature point calculating means 21 stores these calculated values as the feature points of the input curved figure into the storage means 3. It should be understood that 8 sets of feature points are calculated as shown in FIG. 4 in this embodiment. The entered figure is outputted to the output means 4.

Next, the symmetry-judging-line-segment calculating grid producing means 22 produces a square grid from the input coordinate point series stored in the storage means in such a manner that this square grid involves the input curved figure. At this time, it is desirable to produce more than 10 pieces of grids along the longitudinal direction and the lateral direction. The larger a total number of grids becomes, the more precise the symmetry can be judged.

Subsequently, the symmetry-judging-line-segment calculating means 23 traces feature points in a right (left) direction along a series of input coordinate points from one of the feature points calculated by the feature point calculating means 21. At this time, since the total number of feature points is 8 in the curved figure of FIG. 4, the first feature point is connected to the fifth feature point by a straight line, the second feature point is connected to the sixth feature point by a straight line, the third feature point is connected to the seventh feature point by a straight line, and the fourth feature point is connected to the eighth feature point by a straight line. Also, this symmetry-judging-line-segment calculating means 23 similarly traces the grids produced by the symmetry-judging-line-segment calculating grid producing means 22, and also the intersection points of the input curved figure so as to calculate such a symmetry-judging-line-segment as shown in FIG. 5.

Next, the center point of symmetry-judging-line-segment calculating means 24 calculates the coordinate values of the center points of the above-described symmetry-judging-line-segment. After the coordinate values of the center points of all of the symmetry-judging-line-segments have been calculated, the first point symmetry center point candidate point calculating means 25 calculates a coordinate point which constitutes a symmetry center candidate point based upon the calculated center points. FIG. 6 shows an example of 4 pieces of symmetry-judging-line-segments. As shown in FIG. 6, a coordinate of a center of circumscribed rectangular shapes with respect to all of the center points is set as a symmetry center candidate point. For the sake of simplicity, FIG. 6 represents that only portions in the vicinity of the symmetry center candidate point are extracted. The first point symmetry center candidate point/center point distance calculating means 26 calculates distances between the above-described symmetry center candidate point and each of the center points P1 to P4 of the respective symmetry-judging-line-segments.

After the distances between the symmetry center candidate points and the center points of the respective symmetry-judging-line-segments are calculated as to all of the symmetry-judging-line-segments, the point symmetry judging means 27 calculates a fluctuation contained in the calculated distances. In such a case that an average value is calculated as the fluctuation value, when the calculated average value is smaller than, or equal to a constant value approximated to 0, for example 5, this point symmetry judging means 27 judges that the input curved figure owns the point symmetry with respect to the symmetry center candidate point. Assuming now that the calculated average value is selected to be 2.5, the point symmetry judging means 27 judges that the input curved figure shown in FIG. 3(*a*) owns the point symmetry with respect to the above-described symmetry center candidate point.

Next, the point symmetrizing processing means 28 corrects the coordinate values of the set of feature points, and also the coordinate values of the set of the intersection points between the curved figure and the grids in order that the input curved figure is positioned in a point symmetry manner with respect of the above-described symmetry center candidate point, and further the respective sets of intersection points and feature points are positioned in a point symmetry manner. These sets of intersection points are defined by the input coordinate points and the grids, which are calculated by the symmetry-judging-line-segment calculating means 23. Then, the corrected coordinate values are stored into the storage means 3. At this time, the produced figure will constitute such a figure as shown in FIG. 3(*b*). In the output means 4, the curved figure shown in FIG. 3(*a*) is deleted, and another curved figure shown in FIG. 3(*b*) is outputted.

As previously described in detail, in accordance with the present invention, the symmetry center (center point) is automatically extracted from the curved figure entered by the user. Then, it is possible to obtain the figure which is shaped in the point symmetry manner with respect to this symmetry center.

The reason is given as follows. The symmetry owned by the input curved figure with respect to the symmetry center candidate point is judged by calculating the fluctuation contained in the distance values. The distances are defined between the point-symmetry center candidate point calculated by the first point symmetry center candidate point calculating means, and the center points of the symmetry-judging-line-segments produced by the center point of symmetry-judging-line-segment calculating means. When the input curved figure owns the point symmetry, this input curved figure is shaped in such a manner that this input curved figure is arranged in the point symmetry with respect to the symmetry center candidate point.

Also, according to the present invention, the different methods for calculating the symmetry center candidate point can be employed by the second point symmetry center candidate point calculating means and the second point symmetry center candidate point/center point distance calculating means. As a consequence, the input curved figure can be shaped by using the different apparatus arrangements and also the different process segments in such a manner that this input curved figure may be arranged in the point symmetry manner with respect to the symmetry center candidate point.

Also, according to the present invention, the symmetry-judging-line-segment validity judging means judges the symmetry as to the symmetry center candidate point with respect to each of the symmetry-judging-line-segments. In the case that this symmetry-judging-line-segment validity judging means makes such a judgment that the symmetry-judging-line-segment does not own the symmetry with respect to the symmetry center candidate point, it is so judged that the input curved figure does not own the point symmetry with respect to the symmetry center candidate point. As a result, since the point symmetry shaping apparatus can quickly judge that such an input curved figure does not have the point symmetry, the more high speed processing operation can be realized.

Moreover, according to the present invention, the total number of symmetry judging segment line used to judge the symmetry can be controlled by instructing the size of the grid produced from the symmetry-judging-line-segment calculating grid producing means by employing the grid size instructing means. As a consequence, the symmetry judging precision and the symmetry processing speed can be controlled by the user, or the system itself.

It is thus apparent that the present invention is not limited to the above embodiments but may be changed and modified without departing from the scope and spirit of the invention.

Finally, the present application claims the priority of Japanese Patent Application No.Hei9-359468 filed on Dec. 26, 1997, which is herein incorporated by reference.

What is claimed is:

1. A point symmetry shaping apparatus of a curved figure, comprising:

feature point calculating means for calculating a plurality of feature points from a coordinate point series for tracing a trail of an input curved figure to thereby obtain the feature points of the input curved figure;

symmetry-judging-line-segment calculating grid producing means for producing a grid capable of involving said input curved figure based upon the feature points calculated by said feature point calculating means;

symmetry-judging-line-segment calculating means for calculating a set of said feature points and a set of intersection points between a curved line of said curved figure and the grid by tracing said feature points and said intersection points between the curved line and the grid from one of said plural feature points, and also for connecting the respective sets of said feature points to the respective sets of said intersection points by way of straight lines so as to produce a symmetry-judging-line-segment used to judge a point symmetry of said input curved figure;

judging line center point calculating means for calculating a coordinate value of a center point of said symmetry-judging-line-segment calculated by said symmetry-judging-line-segment calculating means;

first point symmetry center candidate point calculating means for calculating a coordinate point which constitutes a symmetry center candidate point from all of the center points calculated by said center point of symmetry-judging-line-segment calculating means;

first point symmetry center candidate point/center point distance calculating means for calculating a distance between said symmetry center candidate point and the center point of said symmetry-judging-line-segment;

point symmetry judging means for judging a point symmetry of said input curved figure in such a manner that a calculation is made of a fluctuation value contained in the distances between said symmetry center candidate point and the center points of said symmetry-judging-line-segments, calculated by said first center candidate point/center point calculating means, and said calculated fluctuation value is compared with a threshold value; and point symmetrizing processing means for correcting the coordinate values of said set of the intersection points between the curved line of said input curved figure and said grid, and also the coordinate values of the feature points in order to shape such an input curved figure having a point symmetry judged by said point symmetry judging means in such a manner that said input curved figure having the point symmetry is positioned in a point symmetry manner with respect to said point symmetry center candidate point.

2. A point symmetry shaping apparatus of a curved figure according to claim 1 wherein:

said feature point calculating means calculates a coordinate value of a vertex of said input curved figure, a maximal point of said input curved figure, and a minimal point of said input curved figure along a horizontal direction and a vertical direction and said plural feature points.

3. A point symmetry shaping apparatus of a curved figure according to claim 1, further comprising:

input means for inputting said curved figure, said input means being arranged by one of a keyboard, a mouse, and a pointing device.

4. A point symmetry shaping apparatus of a curved figure according to claim 1, further comprising:

storage means for storing thereinto said coordinate point series of said input curved figure, and a coordinate point series of said shaped input curved figure in correspondence with said plural feature points calculated by said feature point calculating means.

5. A point symmetry shaping apparatus of a curved figure according to claim 4, further comprising:

output means for outputting said shaped input curved figure which is stored into said storage means.

6. A point symmetry shaping apparatus of a curved figure according to claim 1, further comprising:

symmetry-judging-line-segment validity judging means for judging the point symmetry of said input curved figure based upon said distance calculated by said first center candidate point/center point calculating means, and for supplying said point symmetry judging result to said point symmetry judging means.

7. A point symmetry shaping apparatus of a curved figure according to claim 1, further comprising:

grid size instructing means for instructing a size of said grid produced by said symmetry-judging-line-segment calculating grid producing means so as to control judging precision of the point symmetry of said input curved figure.

8. A point symmetry shaping apparatus of a curved figure according to claim 1, further comprising:

a recording medium for recording thereon a point-symmetry curved figure shaping program, whereby:

said point symmetry shaping apparatus shapes said input curved figure in the point symmetry manner under control of said point-symmetry curved figure shaping program read out from said recording medium.

9. A point symmetry shaping apparatus of a curved figure according to claim 1 wherein:

said point symmetry judging means calculates an average value as said fluctuation value contained in said distances calculated by said first point symmetry center candidate point/center point distance calculating means.

10. A point symmetry shaping apparatus of a curved figure according to claim 1 wherein:

said point symmetry judging means calculates variance as said fluctuation value contained in said distances calculated by said first point symmetry center candidate point/center point distance calculating means.

11. A point symmetry shaping apparatus of a curved figure according to claim 1 wherein:

said point symmetry judging means calculates a median as said fluctuation value contained in said distances calculated by said first point symmetry center candidate point/center point distance calculating means.

12. A point symmetry shaping apparatus of a curved figure, comprising:

feature point calculating means for calculating a plurality of feature points from a coordinate point series for tracing a trail of an input curved figure to thereby obtain the feature points of the input curved figure;

symmetry-judging-line-segment calculating grid producing means for producing a grid capable of involving said input curved figure based upon the feature points calculated by said feature point calculating means;

symmetry-judging-line-segment calculating means for calculating a set of said feature points and a set of intersection points between a curved line of said curved figure and the grid by tracing said feature points and said intersection points between the curved line and the grid from one of said plural feature points, and also for connecting the respective sets of said feature points to the respective sets of said intersection points by way of straight lines so as to produce a symmetry-judging-line-segment used to judge a point symmetry of said input curved figure;

judging line center point calculating means for calculating a coordinate value of a center point of said symmetry-judging-line-segment calculated by said symmetry-judging-line-segment calculating means;

second point symmetry center candidate point calculating means for calculating a coordinate value of a center of a circumscribed rectangular shape of said input curved figure as a point symmetry center candidate point which constitutes a symmetry center candidate point;

second point symmetry center candidate point/center point distance calculating means for calculating a distance between said point-symmetry center candidate point and the center point of said symmetry-judging-line-segment;

point symmetry judging means for judging a point symmetry of said input curved figure in such a manner that a calculation is made of a fluctuation value contained in the distances between said point-symmetry center candidate point and the center points of said symmetry-judging-line-segments, calculated by said second center candidate point/center point calculating means, and said calculated fluctuation value is compared with a threshold value; and point symmetrizing processing means for correcting the coordinate values of said set of the intersection points between the curved line of said input curved figure and said grid, and also the coordinate values of the feature points in order to shape such an input curved figure having a point symmetry judged by said point symmetry judging means in such a manner that said input curved figure having the point symmetry is positioned in a point symmetry manner with respect to said point symmetry center candidate point.

13. A point symmetry shaping apparatus of a curved figure according to claim 12 wherein:

said feature point calculating means calculates a coordinate value of a vertex of said input curved figure, a maximal point of said input curved figure, and a minimal point of said input curved figure along a horizontal direction and a vertical direction and said plural feature points.

14. A point symmetry shaping apparatus of a curved figure according to claim 12, further comprising:

input means for inputting said curved figure, said input means being arranged by one of a keyboard, a mouse, and a pointing device.

15. A point symmetry shaping apparatus of a curved figure according to claim 12, further comprising:

storage means for storing thereinto said coordinate point series of said input curved figure, and a coordinate point series of said shaped input curved figure in correspondence with said plural feature points calculated by said feature point calculating means.

16. A point symmetry shaping apparatus of a curved figure according to claim 15, further comprising:

output means for outputting said shaped input curved figure which is stored into said storage means.

17. A point symmetry shaping apparatus of a curved figure according to claim 12, further comprising:

symmetry-judging-line-segment validity judging means for judging the point symmetry of said input curved figure based upon said distance calculated by said second center candidate point/center point calculating means, and for supplying said point symmetry judging result to said point symmetry judging means.

18. A point symmetry shaping apparatus of a curved figure according to claim 12, further comprising:

grid size instructing means for instructing a size of said grid produced by said symmetry-judging-line-segment calculating grid producing means so as to control judging precision of the point symmetry of said input curved figure.

19. A point symmetry shaping apparatus of a curved figure according to claim 12, further comprising:

a recording medium for recording thereon a point-symmetry curved figure shaping program, whereby:

said point symmetry shaping apparatus shapes said input curved figure in the point symmetry manner under control of said point-symmetry curved figure shaping program read out from said recording medium.

20. A point symmetry shaping apparatus of a curved figure according to claim 12 wherein:

said point symmetry judging means calculates an average value as said fluctuation value contained in said distances calculated by said second center candidate point/center point distance calculating means.

21. A point symmetry shaping apparatus of a curved figure according to claim 12 wherein:

said point symmetry judging means calculates variance as said fluctuation value contained in said distances calculated by said second point symmetry center candidate point/center point distance calculating means.

22. A point symmetry shaping apparatus of a curved figure according to claim 12 wherein:

said point symmetry judging means calculates a median as said fluctuation value contained in said distances calculated by said second point symmetry center candidate point/center point distance calculating means.

23. A point symmetry shaping method of a curved figure, comprising:

a step for calculating a plurality of feature points from a coordinate point series for tracing a trail of an input curved figure to thereby obtain the feature points of the input curved figure;

a step for producing a grid capable of involving said input curved figure based upon the feature points calculated by said feature point calculating step;

a symmetry-judging-line-segment calculating step for calculating a set of said feature points and a set of intersection points between a curved line of said curved figure as and the grid by tracing said feature points and said intersection points between the curved line and the grid from one of said plural feature points, and also for connecting the respective sets of said feature points to the respective sets of said intersection points by way of straight lines so as to produce a symmetry-judging-line-segment used to judge a point symmetry of said input curved figure;

a symmetry-judging-line-segment calculating step for calculating a coordinate value of a center point of said symmetry-judging-line-segment calculated by said symmetry-judging-line-segment calculating step;

a first point-symmetry center candidate point calculating step for calculating a coordinate point which constitutes a symmetry center candidate point from all of the center points calculated by said center point of symmetry-judging-line-segment calculating step;

a first point symmetry center candidate point/center point distance calculating step for calculating a distance between said symmetry center candidate point and the center point of said symmetry-judging-line-segment;

a step for judging a point symmetry of said input curved figure in such a manner that a calculation is made of a fluctuation value contained in the distances between said symmetry center candidate point and the center points of said symmetry-judging-line-segments, calculated by said first center candidate point/center point calculating step, and said calculated fluctuation value is compared with a threshold value; and a step for correcting the coordinate values of said set of the intersection points between the curved line of said input curved figure and said grid, and also the coordinate values of the feature points in order to shape such an input curved figure having a point symmetry judged by said point symmetry judging means in such a manner that said input curved figure having the point symmetry is positioned in a point symmetry manner with respect to said point symmetry center candidate point.

24. A point symmetry shaping method of a curved figure according to claim 23 wherein:

said feature point calculating step calculates a coordinate value of a vertex of said input curved figure, a maximal point of said input curved figure, and a minimal point of said input curved figure along a horizontal direction and a vertical direction and said plural feature points.

25. A point symmetry shaping methods of a curved figure according to claim 23, further comprising:

a step for judging the point symmetry of said input curved figure based upon said distance calculated by said first center candidate point/center point calculating step, and for supplying said point symmetry judging result to said point symmetry judging step.

26. A point symmetry shaping methods of a curved figure according to claim 23, further comprising:

a step for instructing a size of said grid produced by said symmetry-judging-line-segment calculating grid producing step so as to control judging precision of the point symmetry of said input curved figure.

27. A point symmetry shaping method of a curved figure according to claim 23 wherein:

said point symmetry judging step calculates an average value as said fluctuation value contained in said distances calculated by said first point symmetry center candidate point/center point distance calculating step.

28. A point symmetry shaping method of a curved figure according to claim 23 wherein:

said point symmetry judging step calculates a dispension value as said fluctuation value contained in said distances calculated by said first point symmetry center candidate point/center point distance calculating step.

29. A point symmetry shaping method of a curved figure according to claim 22 wherein:

said point symmetry judging step calculates a median as said fluctuation value contained in said distances calculated by said first point symmetry center candidate point/center point distance calculating step.

30. A point symmetry shaping method of a curved figure, comprising:

a step for calculating a plurality of feature points from a coordinate point series for tracing a trail of an input curved figure to thereby obtain the feature points of the input curved figure;

a step for producing a grid capable of involving said input curved figure based upon the feature points calculated by said feature point calculating step;

a symmetry-judging-line-segment calculating step for calculating a set of said feature points and a set of intersection points between a curved line of said curved figure and the grid by tracing said feature points and said intersection points between the curved line and the grid from one of said plural feature points, and also for connecting the respective sets of said feature points to the respective sets of said intersection points by way of straight lines so as to produce a symmetry-judging-line-segment used to judge a point symmetry of said input curved figure;

a step for calculating a coordinate value of a center point of said symmetry-judging-line-segment calculated by said symmetry-judging-line-segment calculating step;

a second point symmetry center candidate point calculating step for calculating a coordinate value of a center of a circumscribed rectangular shape of said input curved figure as a point-symmetry center candidate point which constitutes a symmetry center candidate point;

a second point symmetry center candidate point/center point distance calculating step for calculating a distance between said point symmetry center candidate point and the center point of said symmetry-judging-line-segment;

a step for judging a point symmetry of said input curved figure in such a manner that a calculation is made of a fluctuation value contained in the distances between said point-symmetry center candidate point and the center points of said symmetry-judging-line-segments, calculated by said second center candidate point/center point calculating step, and said calculated fluctuation value is compared with a threshold value; and a step for correcting the coordinate values of said set of the intersection points between the curved line of said input curved figure and said grid, and also the coordinate values of the feature points in order to shape such an input curved figure having a point symmetry judged by said point symmetry judging means in such a manner that said input curved figure having the point symmetry is positioned in a point symmetry manner with respect to said point symmetry center candidate point.

31. A point symmetry shaping method of a curved figure according to claim 30 wherein:

said feature point calculating step calculates a coordinate value of a vertex of said input curved figure, a maximal point of said input curved figure, and a minimal point of said input curved figure along a horizontal direction and a vertical direction and said plural feature points.

32. A point symmetry shaping method of a curved figure according to claim 30, further comprising:

a step for judging the point symmetry of said input curved figure based upon said distance calculated by said first center candidate point/center point calculating step, and for supplying said point symmetry judging result to said point symmetry judging step.

33. A point symmetry shaping method of a curved figure according to claim 30, further comprising:

a step for instructing a size of said grid produced by said symmetry-judging-line-segment calculating grid producing step so as to control judging precision of the point symmetry of said input curved figure.

34. A point symmetry shaping method of a curved figure according to claim 30 wherein:

said point symmetry judging step calculates an average value as said fluctuation value contained in said distances calculated by said second point symmetry center candidate point/center point distance calculating step.

35. A point symmetry shaping method of a curved figure according to claim 30 wherein:

said point symmetry judging step calculates variance as said fluctuation value contained in said distances calculated by said second point symmetry center candidate point/center point distance calculating step.

36. A point symmetry shaping method of a curved figure according to claim 30 wherein:

said point symmetry judging step calculates a median as said fluctuation value contained in said distances calculated by said second point symmetry center candidate point/center point distance calculating step.

* * * * *